United States Patent
Gray

(10) Patent No.: US 9,440,806 B2
(45) Date of Patent: Sep. 13, 2016

(54) COVER FOR DOCK LEVELER

(71) Applicant: Pathfinder Management, Inc., Nashville, TN (US)

(72) Inventor: Thomas Mitchell Gray, Mt. Juliet, TN (US)

(73) Assignee: Pathfinder Management, Inc., Nashville, TN (US)

( * ) Notice: Subject to any disclaimer, the term of this patent is extended or adjusted under 35 U.S.C. 154(b) by 0 days.

(21) Appl. No.: 14/991,652

(22) Filed: Jan. 8, 2016

(65) Prior Publication Data

US 2016/0201316 A1  Jul. 14, 2016

Related U.S. Application Data

(60) Provisional application No. 62/101,723, filed on Jan. 9, 2015.

(51) Int. Cl.
| B65G 69/32 | (2006.01) |
| B65G 69/00 | (2006.01) |
| B65G 69/28 | (2006.01) |

(52) U.S. Cl.
CPC .......... B65G 69/008 (2013.01); B65G 69/287 (2013.01); B65G 69/2876 (2013.01)

(58) Field of Classification Search
CPC .............. B65G 69/008; B65G 69/287; B65G 69/2876
USPC ......... 52/64, 73, 74, 173.2, 3; 14/69.5, 71.1; 160/87–91, 127; 49/72, 472, 474
See application file for complete search history.

(56) References Cited

U.S. PATENT DOCUMENTS

| 364,853 A | * | 6/1887 | Pennington | E04F 10/02 135/117 |
| 742,246 A | * | 10/1903 | Sorensen | E04F 10/10 135/117 |
| 1,134,635 A | * | 4/1915 | Osbron | E04B 1/3444 182/113 |
| 1,605,200 A | * | 11/1926 | Bacon | B60J 3/005 160/105 |
| 2,276,550 A | * | 3/1942 | Skyum | E04F 10/0614 160/65 |
| 2,565,545 A | * | 8/1951 | Card | E04F 10/08 160/58.1 |
| 3,388,510 A | * | 6/1968 | Smith | E04F 10/08 52/15 |
| 4,422,491 A | * | 12/1983 | Cusick, III | E04F 10/04 160/58.1 |
| 4,612,948 A | * | 9/1986 | Simpson | E04H 15/001 135/117 |
| 4,768,317 A | * | 9/1988 | Markham | E04H 15/58 135/117 |

(Continued)

*Primary Examiner* — Robert Canfield
(74) *Attorney, Agent, or Firm* — McCarter & English, LLP; Jill Ann Mello; Anita M. Bowles

(57) ABSTRACT

A device for covering a portion of a dock leveler deck and a gap between the deck and a surrounding dock floor surface lying inward relative to a loading dock door is provided. The device may include a rigid frame and a barrier secured to the rigid frame and configured to cover the portion of the dock leveler deck and the gap inward of the loading dock door when the rigid frame is attached to the loading dock door and the loading dock door is fully lowered.

17 Claims, 4 Drawing Sheets

(56) References Cited

U.S. PATENT DOCUMENTS

| | | | |
|---|---|---|---|
| 4,888,921 A * | 12/1989 | Markham | E04H 15/58 52/273 |
| 5,016,391 A | 5/1991 | Miller et al. | |
| 5,513,670 A * | 5/1996 | Childress | E04H 15/003 135/154 |
| 6,412,536 B1 * | 7/2002 | Vannetta | E04F 10/02 135/117 |
| 7,353,769 B2 * | 4/2008 | Unrast | E04F 10/00 114/361 |
| 8,037,645 B2 * | 10/2011 | Michel | E04F 10/005 52/151 |
| 8,104,527 B1 * | 1/2012 | Konda | E04F 10/005 160/83.1 |
| 8,214,956 B2 | 7/2012 | Metz et al. | |
| 8,407,841 B2 | 4/2013 | Wessel | |
| 8,683,752 B1 * | 4/2014 | Gonzalez | E04F 10/005 160/54 |
| 8,997,770 B1 * | 4/2015 | Martin | A47C 7/66 135/117 |
| 9,328,516 B2 * | 5/2016 | Albert | E04F 10/005 |
| 2011/0010871 A1 * | 1/2011 | Metz | B65G 69/2876 14/69.5 |
| 2011/0079674 A1 | 4/2011 | Prochnow et al. | |

* cited by examiner

COVER FOR DOCK LEVELER

RELATED APPLICATION

The present application claims priority to U.S. Provisional Application No. 62/101,723 filed Jan. 9, 2015, which is incorporated herein by reference in its entirety.

TECHNICAL FIELD

The present disclosure relates to a device for covering at least a portion of a dock leveler deck and a gap between the deck and a surrounding dock floor surface.

BACKGROUND

Dock levelers are commonly used in loading docks of commercial and industrial buildings to match a level of the floor of the loading dock of the building with a bed or floor of the vehicle to permit personnel to easily move goods or equipment to load and unload the vehicle (e.g. via forklifts). Typically a dock leveler includes a metal deck plate and a mechanism for adjusting the height and possibly also the slope of the metal deck plate to compensate for a height difference between a level of the bed or floor of the vehicle and a level of the loading dock floor. Often a dock leveler also includes an extension plate or lip that extends to span a gap between the edge of the loading dock and an edge of the bed or floor of the vehicle. The mechanism for adjusting the height and slope of the metal deck plate is usually disposed in a pit in the floor of the loading dock. This pit has an opening in the loading dock floor that is larger than the metal deck plate. During periods of time that the dock leveler is not being used, the metal deck plate is in a position that is level with the floor of the loading dock. In this position, there are gaps between the edges of the metal deck plate of the dock leveler and the floor of the loading dock due to the pit opening being larger than the metal deck plate. The pit in which the dock leveler is disposed often has an opening on an outward facing side of the loading dock as well as an opening in the loading dock floor, which exposes the pit to environmental conditions and contaminants outside the loading dock even when the loading dock door is fully lowered. This can lead to substantial heat transfer from outside the loading dock to inside the building or vice versa due to air flow through the pit and the gaps, and due to thermal conduction through the metal deck plate of the dock leveler even when the loading dock door is fully closed. Further, contaminants can enter the building through the gap, especially during windy conditions.

SUMMARY

According to some embodiments, a device for covering at least a portion of a dock leveler deck and a gap between the deck and a surrounding dock floor surface is provided. The device automatically raises and lowers along with the loading dock door to which it is attached.

The device includes a rigid frame with a mounting portion and a projection portion in accordance with an embodiment. The mounting portion is configured to rigidly attach the rigid frame to an inward-facing portion of a loading dock door. The projection portion extends away from the inward-facing portion of the loading dock door when the rigid frame is attached to the loading dock door. The device also includes a barrier secured to the projection portion of the rigid frame and configured to cover the portion of the dock leveler deck and the gap inward of the loading dock door when the rigid frame is attached to the loading dock door and the loading dock door is fully lowered.

The width of the projection portion of the rigid frame is larger than or about equal to a width of the dock leveler deck and the gap in some embodiments. The projection portion has a length such that the projection portion extends over the portion of the dock leveler deck and the gap extending inward relative to the loading dock door in some embodiments. An angle between the projection portion of the rigid frame and the inward-facing portion of the loading dock door can be constant and not change when the loading dock door is raised or lowered.

The mounting portion of the rigid frame can be configured to be attached to a lowest portion of the loading dock door. Further, the mounting portion of the rigid frame can be configured for attachment to a single section of a sectional loading dock door.

The device can be configured such that the loading dock door can be opened at least to at least 80% of its fully raised position with the device attached. In some embodiments, the device is configured such that the loading dock door can be fully opened with the device attached.

The barrier can be a wind-blocking material. The barrier can be a thermally insulating material. In some embodiments, the barrier includes a rubber material. In some embodiments, the barrier includes a stain-resistant and/or tear resistant material. In some embodiments, the barrier includes a water-resistant material.

In some embodiments, the rigid frame includes one or more supports extending between the mounting portion and the projection portion of the rigid frame. In some embodiments, the projection portion of the rigid frame includes an outer rectangular framework. The projection portion of the rigid frame can also include one or more supports extending from one side of the outer rectangular framework to an opposite side of the outer rectangular framework.

In some embodiments, the projection portion of the frame is configured to exert a downward force on the surrounding dock floor surface when the frame is attached to the loading dock door and the loading dock door is in a fully lowered position.

In some embodiments, the rigid frame includes a framework of tubing or piping. The rigid frame can be made of a polymer material. The rigid frame can be made of a material including polyvinyl chloride (PVC). In some embodiments, the rigid frame includes PVC tubing or PVC piping.

BRIEF DESCRIPTION OF THE DRAWINGS

The drawings are intended to illustrate aspects of various embodiments and are not intended to show relative sizes and dimensions, or to limit the scope of examples or embodiments. In the drawings, the same numbers are used throughout to reference like features and components of like function.

DETAILED DESCRIPTION

Some embodiments of the disclosure provide a device for covering at least a portion of a dock leveler deck and a gap between the dock leveler deck and a surrounding dock floor surface. In some embodiments, the device is configured to be secured to a loading dock door enabling the device to be raised and lowered as the dock leveler door is raised and lowered without substantially interfering with the operation of the loading dock door. In some embodiments, the device is sufficiently lightweight such that the weight of the device does not substantially increase a load on a system for raising and lowering the loading dock door. In some embodiments, the device provides a barrier to reduce or control entry of contaminants through the gap, provides thermal insulation over the dock leveler deck, and prevents or reduces drafts through the gap when the loading dock door is in a fully lowered position. In some embodiments the device is configured to exert a downward force to prevent the cover over the dock leveler deck and gap from being displaced by drafts through the gap.

Figure 1:
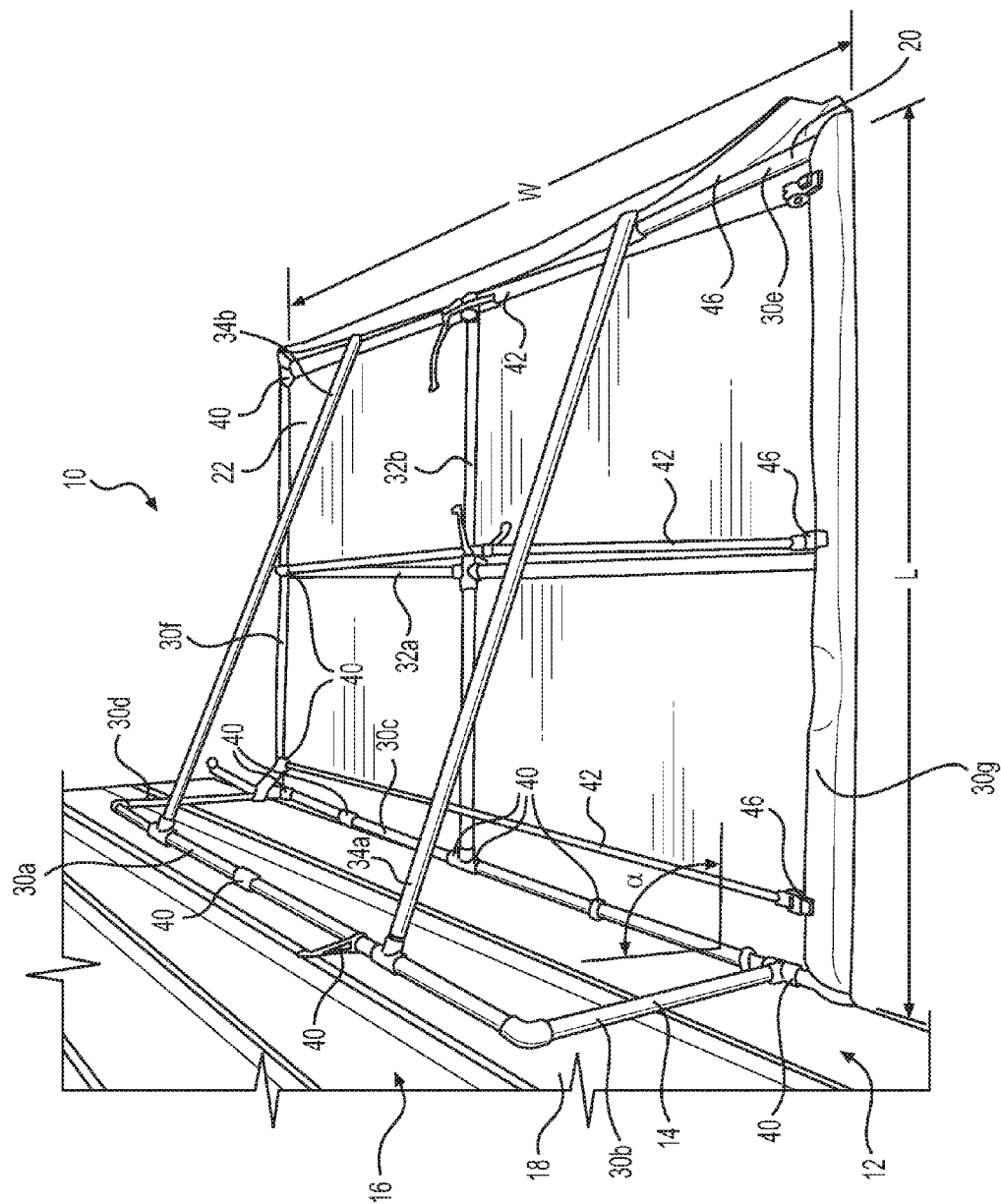
FIG. 1 is an image of a side view of a device for covering a dock leveler deck mounted to a loading dock door in a fully lowered position, in accordance with an embodiment.
Figure 2:
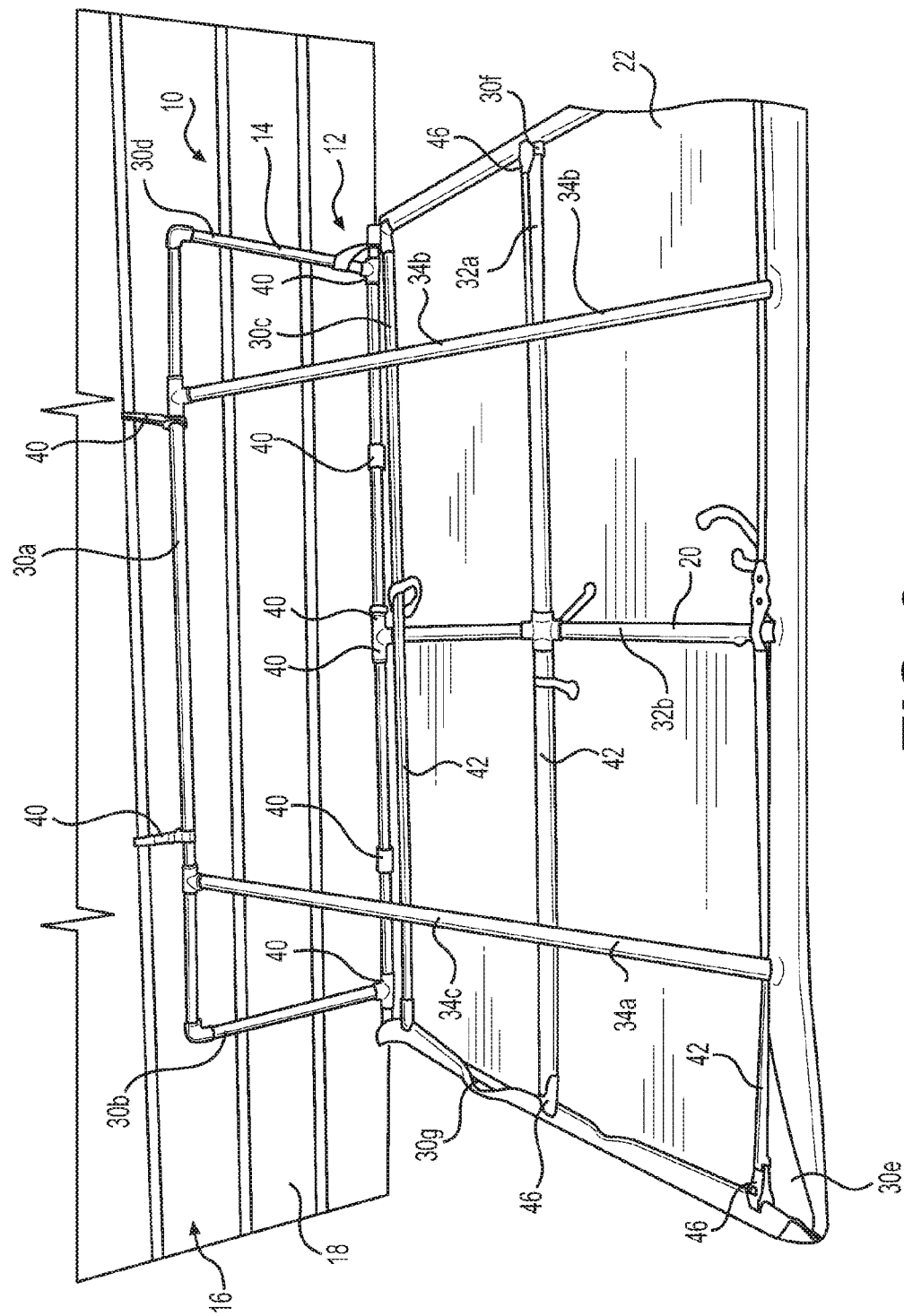
FIG. 2 is an image of a front view of the device of FIG. 1.
Figure 3:
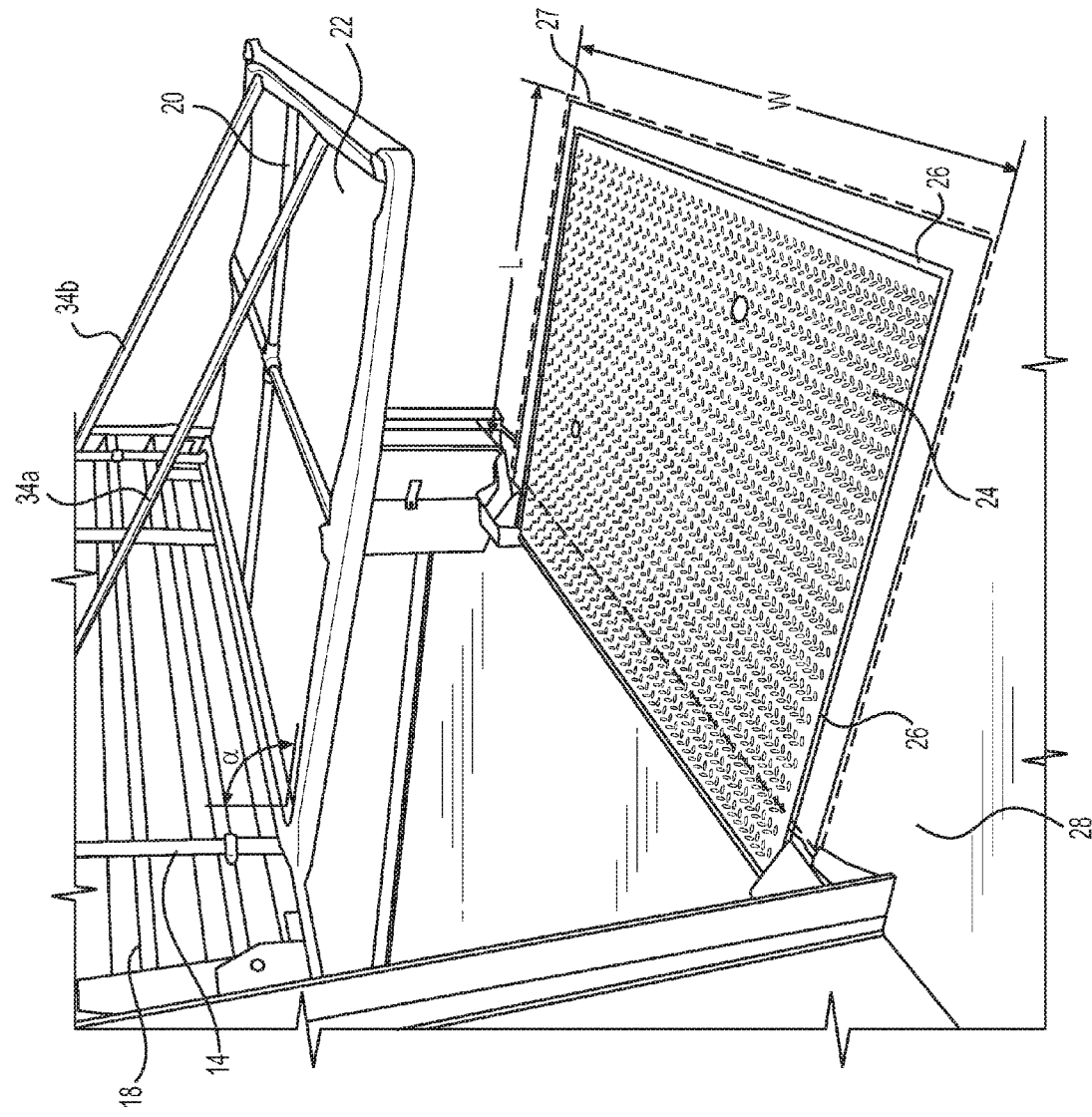
FIG. 3 is an image of a side view of the device of FIG. 1 with the loading dock door partially raised.

FIGS. 1 through 3 are images of a device 10 for covering at least a portion of a dock leveler deck 24 and a gap 26 (see FIG. 3) between the dock leveler deck 24 and a surrounding dock floor surface 28, in accordance with an embodiment. As shown in FIGS. 1 and 2, the device 10 includes a rigid frame 12 with a mounting portion 14 configured to rigidly attach the rigid frame 12 to an inward-facing portion 18 of a loading dock door 16 and a projection portion 20 that extends away from the inward-facing portion 18 of the loading dock door 16 when the rigid frame 12 is attached to the loading dock door 16.

The device 10 also includes a barrier 22 secured to the projection portion 20 of the rigid frame 12 and configured to cover the portion of the dock leveler deck 24 and the gap 26 inward of the loading dock door 16 when the rigid frame 12 is attached to the loading dock door 16 and the loading dock door 16 is fully lowered. The area covered by the barrier that includes the portion of the dock leveler deck and the gap inward of the loading dock door is illustrated by dotted line 27 in FIG. 3.

In some embodiments, the projection portion 20 can have a width W larger than or about equal to a width of the dock leveler deck 24 and the gap 26. The projection portion 20 can have a length L such that the projection portion 20 extends over the portion of the dock leveler deck 24 and the gap extending inward relative to the loading dock door 16 to cover the gap 26 between the dock leveler deck 24 and the floor surface 28 of the building. As shown in FIGS. 1 and 2, when the loading dock door 16 is fully lowered, the portion of the dock leveler deck 24 and the gap 26 that extend inward of the loading dock door are covered by barrier 22, which reduces or prevents entry of contaminants into the loading dock through the gap 26, forms a barrier to drafts blowing through the gap 26, and provides thermal insulation over the metallic dock leveler deck 24.

In some embodiments, when the device 10 is attached to the loading dock door 16, the angle α between the projection portion 20 of the rigid frame 12 and the inward-facing portion 18 of the loading dock door 16 is fixed and does not change when the loading dock door 16 is raised or lowered. If the projection portion 20 and the barrier 22 were not held in a fixed angle relative to the loading dock door, the projection portion 20 and the barrier 22 would have to have a significant weight to prevent drafts through the gap 26 from displacing the projection portion and the barrier during high wind conditions. The fixed angle between the projection portion 20 and the inward-facing portion 18 of the loading dock door and securing the device to the loading dock door enables the position of the projection portion and the barrier over the dock lever deck and gap to be maintained when subjected to wind gusts through the gap, even if the rigid frame and barrier are relatively lightweight.

The rigid frame 12 can be constructed from a variety of different materials. In some embodiments, the rigid frame 12 is made of framework of tubing. The rigid frame 12 can be constructed from a rigid material such as rigid plastic, stainless steel, or other similar material. For example, the rigid frame 12 can be made of polymer materials such as polyvinyl chloride (PVC) (e.g., PVC tubing). In some embodiments, a rigid frame of plastic tubing may be desirable to reduce the overall weight of the device, thereby reducing the increase in the additional weight to be handled by the mechanism that raises and lowers the loading dock door when the device is attached to the loading dock door.

As explained above, in some embodiments, the rigid frame is constructed of a framework of tubing. For example, in some embodiments, the mounting portion 14 includes a framework of tubing in the shape of a rectangle with an upper tubing member 30a, a lower tubing member 30c, and side tubing members 30b and 30d (see FIGS. 1 and 2). The upper tubing member 30a and the lower tubing member 30c may be configured to be secured to the inward-facing portion of the loading dock door 18 by one or more attachment elements 40 (see FIG. 1).

In some embodiments, projection portion 20 includes a framework of tubing with front tubing member 30e and projecting tubing members 30f and 30g that, together with the lower tubing member 30c, form a frame for supporting the barrier 22. In some embodiments, the projection portion 20 also includes one or more cross-support members, such as cross-support member 32a that connects projecting tubing member 30f and projecting tubing member 30g and cross-support member 32b that connects the front tubing member 30e and the lower tubing member 30c.

Figure 4:
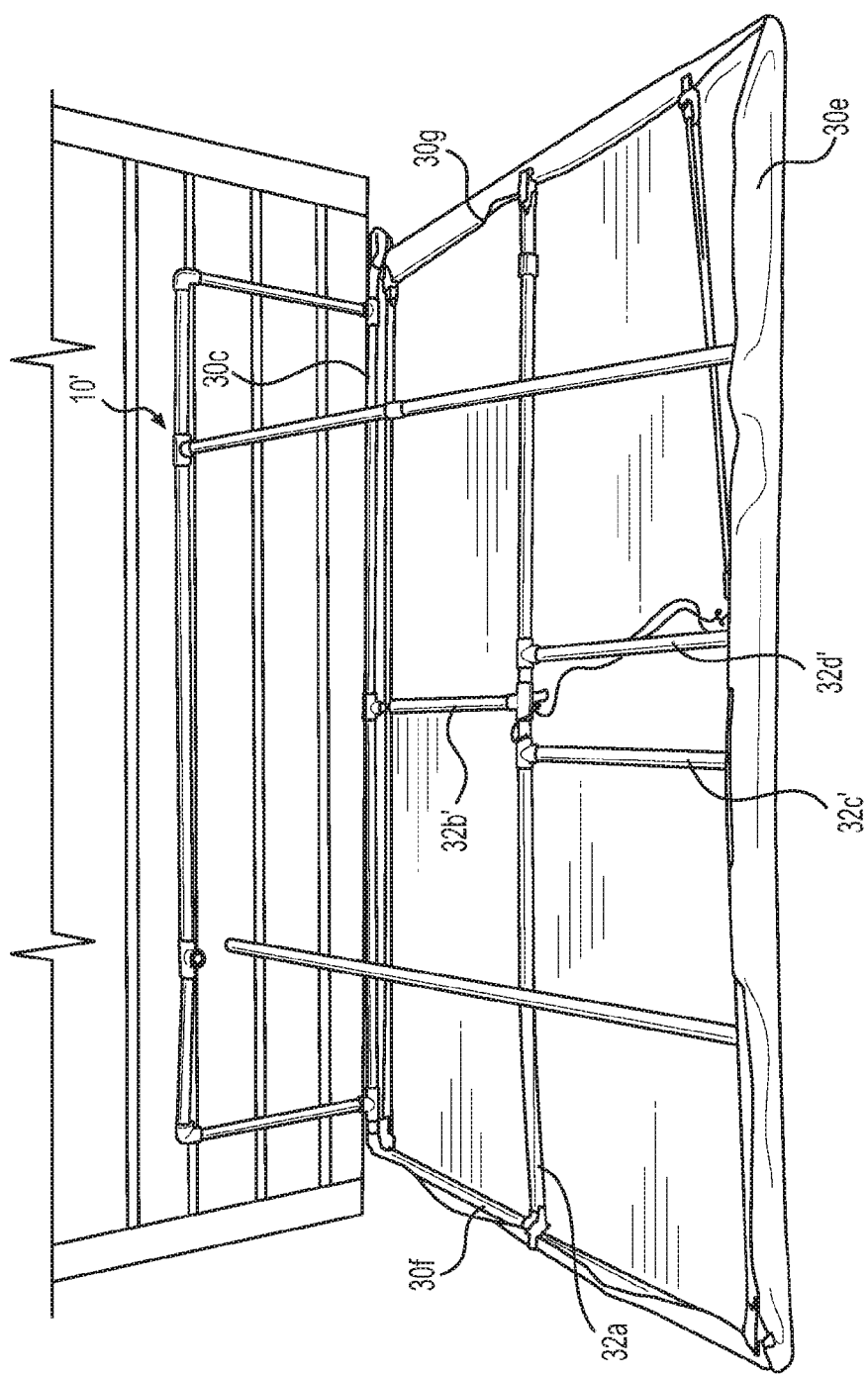
FIG. 4 is an image of a front view of a device for covering a dock leveler deck mounted to a loading dock door in a fully lowered position in accordance with another embodiment.

FIG. 4 depicts another embodiment of a device 10' including a cross-support member 32a that connects projecting tubing member 30f and projecting tubing member 30g. However, instead of one cross-support member connecting front tubing member 30e and lower tubing member 30c, device 10' includes a cross-support member 32b' connecting lower tubing member 30c to cross-support member 32a and two cross-support members 32c', 32d' connecting cross-support member 32a to front tubing member 30e. One of ordinary skill in the art, in view of the present disclosure, will appreciate that many different configurations of cross-support members could be employed.

Turning again to FIGS. 1 through 3, in some embodiments the rigid frame 12 includes additional supports to maintain the angle α of the projection portion 20 relative to the portion of the loading dock door 18. For example, rigid frame 12 further includes supports 34a and 34b extending between the upper tubing member 30a of the mounting portion 12 and the front tubing member 30e of the projection portion 14. One of ordinary skill in the art, in view of the present disclosure, will appreciate that many different configurations of support members for maintaining an angle between the projection portion and the loading dock door could be employed.

In some embodiments, the loading dock door is a sectional overhead type of loading dock door. In some embodiments, the mounting portion 14 of the rigid frame is configured to be secured to a single section of a sectional loading dock door as shown in FIGS. 1 and 2. In some embodiments, the single section is the lowest section of the loading dock door. By being mounted to only one section of the sectional loading dock door, the device 10 does not interfere with pivoting of one section of the loading dock door relative to the other sections when the loading dock door is raised and lowered. In some embodiments, the loading dock door 16 can be fully opened when the device is attached to the loading dock door. In some embodiments, the loading dock door can be opened to at least 80% of its fully opened height while the device 10 is attached to the loading dock door 16. In some embodiments, the loading dock door can be opened to at least 90% of its fully opened height while the device is attached to the loading dock door.

As noted above, the projection portion of 20 of the rigid frame supports the barrier 22. The barrier 22 can be constructed from a variety of different materials. In some embodiments, the barrier 22 is non-rigid. In some embodiments, the barrier 22 is made of a thermal insulating material to reduce heat transfer from inside to outside the building and vice-versa during periods of time when the loading dock door is fully closed and the dock leveler 24 is not being used. In some embodiments, the barrier 22 is made of wind-blocking material to prevent the entry of contaminants and debris inside the building and to prevent or reduce drafts through the gap. In some embodiments, the barrier 22 is made of water-resistant material. For example, the barrier 22 can be made of a rubber material. In some embodiments, the barrier 22 can be covered or coated with a protective material to resist marking, staining or damage to an underlying portion of the barrier.

As noted above, the barrier 22 is secured to the rigid frame 12. The barrier 22 can be attached to or secured to the rigid frame 12 in many different ways using any appropriate mechanism. In some embodiments, the barrier 22 is secured to the rigid frame via friction and tension. For example, barrier 22 may be wrapped around the projection portion 20 of the rigid frame and is placed in tension using clips 46 attached to edges of the barrier 22 and connected by tension members (e.g., ropes 42) as shown in FIGS. 1 and 2. By attaching barrier 22 to the projection portion 22 using tension members and friction, the barrier 22 may be easily removed (e.g., for cleaning) or replaced. In other embodiments, the barrier 22 can be attached directly to the rigid frame 12 through any suitable mechanical means (e.g., using an adhesive, staples, clamps, screws, brackets, etc.).

Embodiments provide a dock leveler cover that is automatically raised and lowered with the loading dock door to which it is attached. Embodiments are sufficiently lightweight that they do not substantially increase a load on the mechanism for raising and lowering the loading dock door, while providing a substantial barrier to the entry of drafts through the gap between the dock leveler deck and the surrounding dock floor and thermal insulation of the dock leveler deck. Some embodiments employ a tubular framework that supports a non-rigid barrier to reduce the weight of the device. Embodiments do not substantially interfere with the raising and lowering of the loading dock door.

For example, the inventor constructed the device shown in FIGS. 1 through 3 using PVC tubing for the rigid frame and a flexible rubber material for the barrier. The barrier was attached to the projection portion of the rigid frame via tension using plastic clips and rope tension members. The barrier covered the dock leveler and the gap without substantially increasing the weight to be lifted by the loading dock door opener.

In this application, the use of the singular includes the plural unless specifically stated otherwise. The articles "a" and "an" are used herein to refer to one or to more than one (i.e. to at least one) of the grammatical object of the article. By way of example, "an element" means one element or more than one element.

In this application, the use of "or" means "and/or" unless context clearly indicates otherwise. Furthermore, the use of the term "including", as well as other forms, such as "includes" and "included", is not limiting. The term "including" is used herein to mean, and is used interchangeably with, the phrase "including but not limited to." Any range described herein will be understood to include the endpoints and all values between the endpoints.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

The invention claimed is:

1. A device for covering at least a portion of a dock leveler deck and a gap between the deck and a surrounding dock floor surface lying inward relative to a loading dock door, the device comprising:
   a rigid frame including:
      a mounting portion rigidly attaching the rigid frame to an inward-facing portion of a loading dock door; and
      a projection portion that extends away from the inward-facing portion of the loading dock door, the projection portion having width larger than or about equal to a width of the dock leveler deck and the gap, the projection portion having a length such that the projection portion extends over the portion of the dock leveler deck and the gap extending inward relative to the loading dock door; and
   a barrier secured to the projection portion of the rigid frame and configured to cover the portion of the dock leveler deck and the gap inward of the loading dock door when the loading dock door is fully lowered.

2. The device of claim 1, wherein an angle between the projection portion of the rigid frame and the inward-facing portion of the loading dock door is constant when the loading dock door is raised or lowered.

3. The device of claim 1, wherein the mounting portion of the rigid frame is attached to a lowest portion of the loading dock door.

4. The device of claim 1, wherein the mounting portion of the rigid frame is attached to a single section of a sectional loading dock door.

5. The device of claim 1, wherein the device is configured such that the loading dock door can be opened to at least 80% of its fully raised position with the device attached.

6. The device of claim 1, wherein the barrier comprises a wind-blocking material.

7. The device of claim 1, wherein the barrier comprises a thermally insulating material.

8. The device of claim 1, wherein the barrier comprises a rubber material.

9. The device of claim 8, wherein the barrier further comprises a protective material.

10. The device of claim 1, wherein the barrier comprises a water-resistant material.

11. The device of claim 1, wherein the projection portion of the rigid frame is configured to exert a downward force on the surrounding dock floor surface when the loading dock door is in a fully lowered position.

12. The device of claim 1, the rigid frame further comprising one or more supports extending between the mounting portion and the projection portion of the rigid frame.

13. The device of claim 1, wherein the projection portion of the rigid frame includes an outer rectangular framework.

14. The device of claim 13, wherein the projection portion of the rigid frame further includes one or more supports extending from one side of the outer rectangular framework to an opposite side of the outer rectangular framework.

15. The device of claim 1, wherein the rigid frame comprises a polymer material.

16. The device of claim 15, wherein the rigid frame comprises polyvinyl chloride.

17. The device of claim 1, wherein the rigid frame comprises a framework of tubing.

* * * * *